May 29, 1962 A. H. MARK 3,036,434
THRUST BEARINGS FOR HYDROSTATIC TRANSMISSIONS
Filed Dec. 29, 1960 3 Sheets-Sheet 1

INVENTOR.
ALEXANDER HING MARK
BY
Wolfe, Hubbard, Voit & Osann
ATTORNEYS.

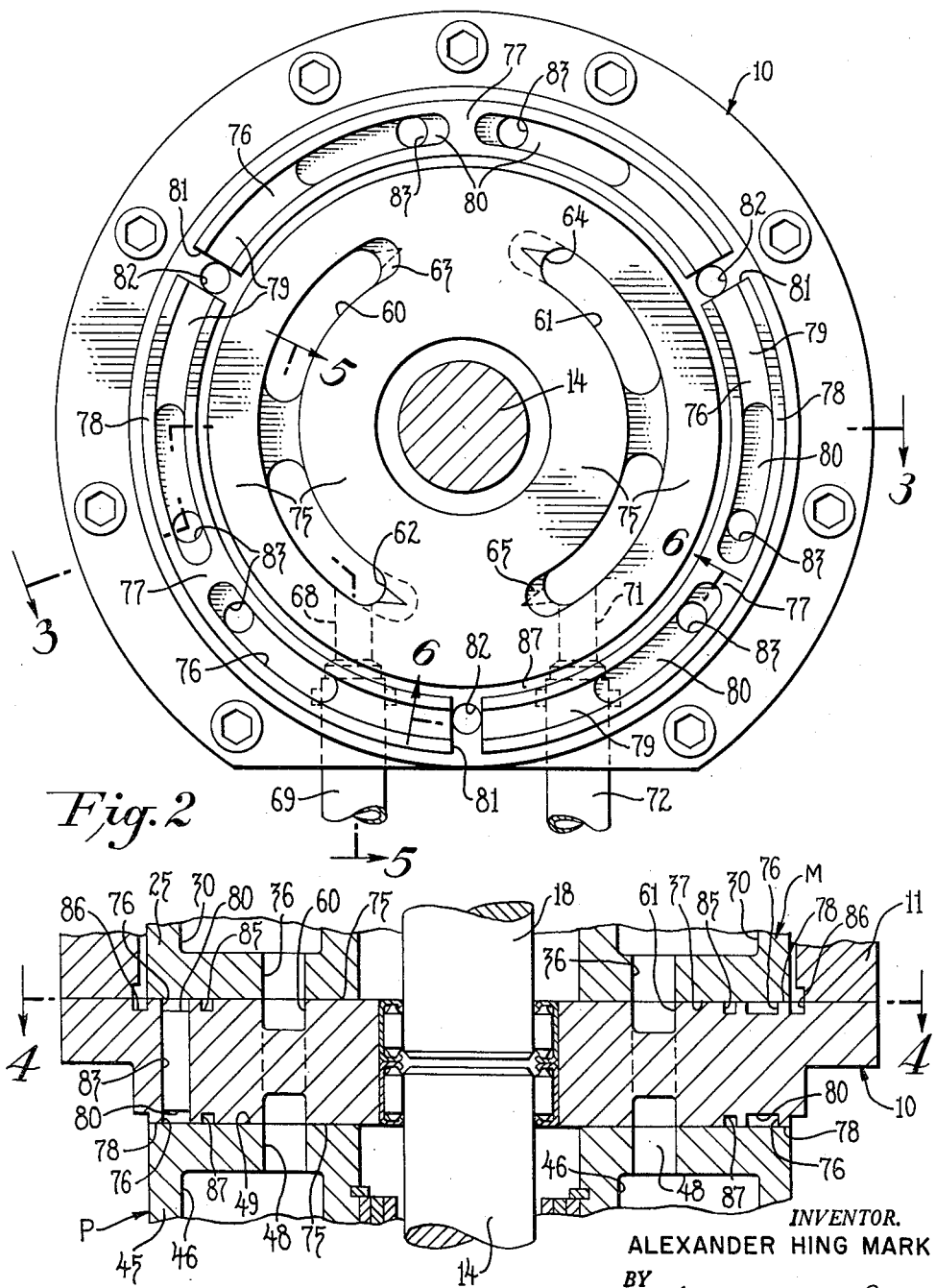

May 29, 1962  A. H. MARK  3,036,434
THRUST BEARINGS FOR HYDROSTATIC TRANSMISSIONS
Filed Dec. 29, 1960  3 Sheets-Sheet 3
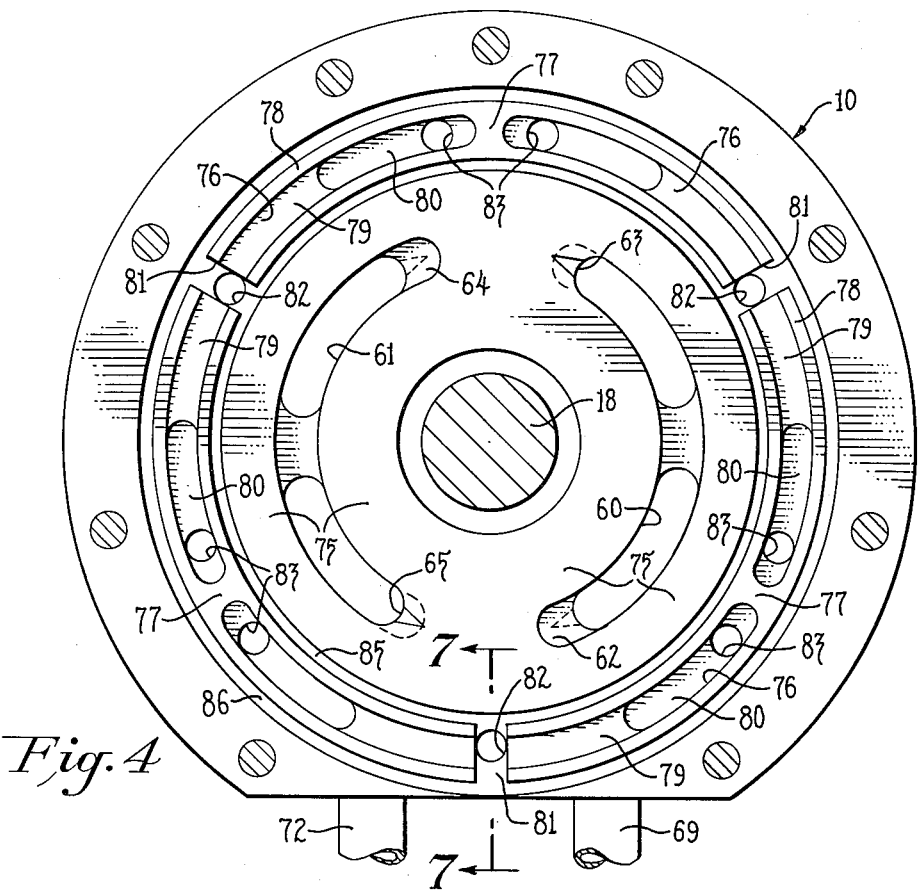
Fig. 4
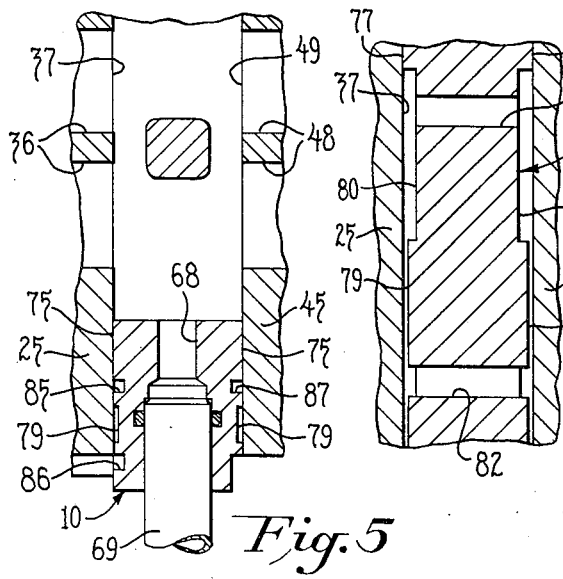
Fig. 5
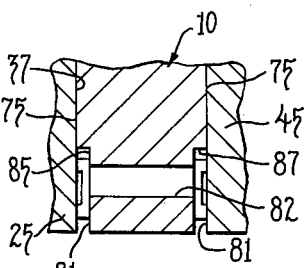
Fig. 6
Fig. 7
INVENTOR.
ALEXANDER HING MARK
BY
Wolf, Hubbard, Voit & Osann
ATTORNEYS.

United States Patent Office 3,036,434
Patented May 29, 1962

3,036,434
THRUST BEARINGS FOR HYDROSTATIC TRANSMISSIONS
Alexander Hing Mark, Livonia, Mich., assignor to Massey-Ferguson Inc., Detroit, Mich., a corporation of Maryland
Filed Dec. 29, 1960, Ser. No. 79,452
8 Claims. (Cl. 60—53)

The invention relates to hydrostatic power transmissions of the axial piston type and it is more particularly concerned with improved thrust bearings for the rotating cylinder and piston assemblies of such transmissions.

The improved thrust bearings are particularly well adapted for use in transmissions of the type in which the rotating cylinder and piston assemblies of the pump and motor units are disposed in back-to-back relation at opposite sides of a common valve plate which absorbs the thrust of the assemblies and provides a fluid sealing and thrust bearing surface around the passages. The primary object of the invention is to increase the bearing capacity of such valve plates without necessitating an increase in their dimensions.

Another object is to provide a valve plate construction which, in addition to the usual frictional thrust bearing surface, presents an auxiliary, hydrodynamic thrust bearing of substantial capacity.

Still another object is to provide a bearing plate presenting hydrodynamic thrust bearings for opposed rotating members interrelated so that adequate pressures are maintained for the support of both members regardless of their relative rotative speeds.

A more specific object is to provide a valve plate presenting hydrodynamic thrust bearings on opposite side faces interconnected so that either bearing may supply fluid under pressure to the other bearing depending upon the relative rates of rotation of the members supported by the bearings.

Other objects and advantages of the invention will become apparent from the following detailed description of the preferred embodiment illustrated in the accompanying drawings, in which:

FIG. 2 is a transverse sectional view through the transmission taken in a plane substantially on the line 2—2 of FIG. 1, showing one face of the valve plate interposed between the cylinder and piston assemblies of the pump and motor units.

FIG. 3 is a sectional view through the valve plate and adjacent parts of the transmission taken in off-set planes substantially on the line 3—3 of FIG. 2.

FIG. 4 is a sectional view taken in a plane substantially on the line 4—4 of FIG. 3 showing the face of the valve plate opposite to that shown in FIG. 2.

FIG. 5 is a fragmentary sectional view taken substantially on the line 5—5 of FIG. 2.

FIG. 6 is a fragmentary sectional view taken substantially on the line 6—6 of FIG. 2.

FIG. 7 is a fragmentary sectional view taken substantially on the line 7—7 of FIG. 4.

Figure 1:
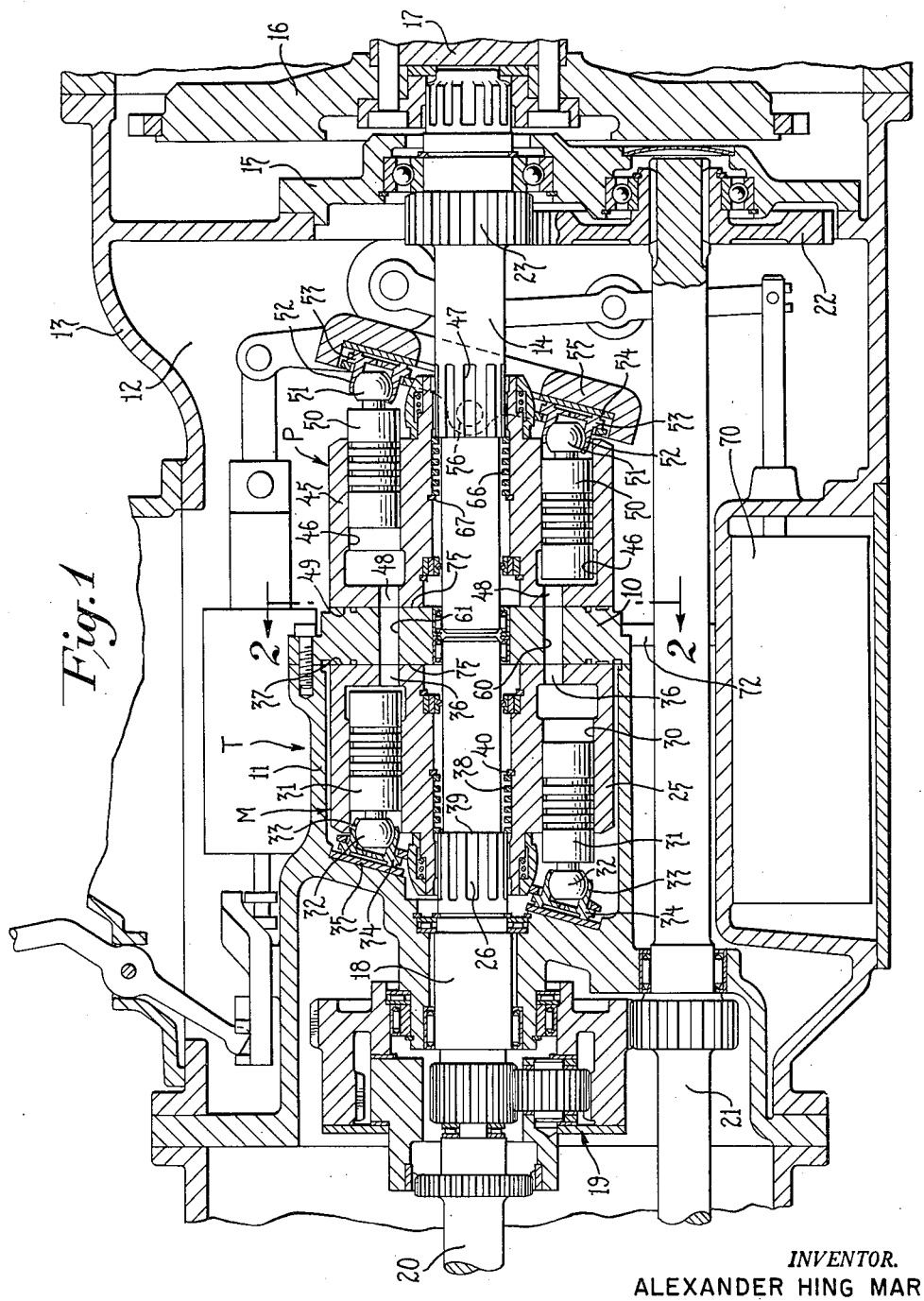
FIGURE 1 is a longitudinal sectional view through a hydrostatic transmission embodying the features of the invention.

While a preferred embodiment of the invention has been shown and will be described in detail, this is not intended to limit the invention to the particular construction or application illustrated, the intention being to cover all modifications, adaptations and applications falling within the sprit and scope of the invention as more broadly or generally characterized in the appended claims.

For purposes of illustration, the invention has been shown in FIG. 1 as incorporated in a hydrostatic power transmission T installed in and functioning as the speed changer in the drive for a motor vehicle such as a tractor. In the preferred form shown, the transmission comprises a pump unit P and a motor unit M, assembled back-to-back at opposite sides of a valve plate 10. The valve plate, in this instance, is removably secured to the open end of a casing 11 defining a cylindrical compartment for housing the motor M. The entire assembly is adapted to be mounted in the transmission compartment 12 provided in the body 13 of the tractor.

In the illustrative embodiment, the pump P is driven by an input shaft 14 journaled in a partition 15 in the tractor body and having a drive connection with a flywheel 16 fixed on the crank shaft 17 of the tractor engine. Pump P supplies pressure fluid through passages in the valve plate 10 for operating the motor M which has a shaft 18 extending through the rear wall of the casing 11. Motor shaft 18 is coupled by a combining planetary gear unit 19 with a power output shaft 20 which extends in the usual manner to the differential for the tractor drive wheels. Gear unit 19 combines the power output of the motor shaft 18 with the power supplied directly from the tractor engine through a shaft 21 driven, in this instance, by a gear 22 meshing with a pinion 23 on the input shaft 14. The arrangement is such that the speed and direction of rotation of the output shaft 20 may be regulated by varying the speed of the motor M.

The pump P and motor M are basically alike except that the pump is constructed to permit adjustment of its volumetric capacity as a means for regulating the speed of the motor M. Referring first to the motor portion of the transmission, the motor as shown comprises an annular barrel body 25 mounted coaxially on the shaft 18 and having at one end a series of internal splines engageable in mating grooves 26 in the shaft to couple the parts for rotation as a unit.

The body 25 is formed with a series of axially disposed cylinder bores 30 uniformly spaced apart around the central axis of the body and opening through the end of the body remote from the valve plate 10. Each cylinder is fitted with a working piston 31 having a ball element 32 engaging in a socket element 33 provided on an annular shoe 34. The shoe 34 bears against and is rotatable on an annular thrust plate or bearing 35 carried by the casing 11. As will be seen by reference to FIG. 1, the thrust plate 35 is inclined at an angle to the axis of the body 25 such that the outward thrust of the pistons 31 will generate torque tending to rotate the body 25 and shaft 18 to which it is fixed.

Each of the motor cylinders 30 opens through a port 36 in the inner face 37 of the body which is held in sealing engagement with the adjacent face of the valve plate 10 by the hydraulic force generated in the cylinders 30 supplemented by a small additional force applied by a spring 38. This spring is interposed between a shoulder 39 on the shaft 18 and an abutment in the form of a snap ring 40 fitted in a groove in the inner wall of the member 25.

The pump P also comprises an annular body or barrel 45 formed with a series of axially disposed cylinder bores 46 uniformly spaced apart around its axis. The barrel 45 is mounted coaxially on the input shaft 14 and is drivingly connected thereto by internal splines engaging in complemental grooves 47 in the shaft. Ports 48 for the inner ends of the cylinders open through the inner face 49 of the barrel which is in bearing engagement with the adjacent face of the valve plate 10 described hereinafter.

Each of the cylinders 46 opens through the rear end of the barrel and is fitted with a working piston 50 having a ball shaped head 51 engageable in a socket element 52 formed on or carried by an annular shoe 53. The shoe slidingly engages an annular thrust bearing 54 carried by an annular slant-plate 55. Slant-plate 55 is supported by the usual diametrically projecting trunnions 56 to pivot about an axis transverse to and intersecting the axis of the shaft 14 from the angularly disposed position in which it is shown in FIG. 1 to a position substantially normal to the shaft.

When the pump body 45 is rotated with the slant-plate 55 in a tilted position, pistons 50 will be reciprocated through strokes of a length determined by the angle to which the plate is tilted. With the slant-plate 55 normal to the shaft, the volumetric capacity of the pump is reduced to zero and no fluid is delivered to the motor. As the slant-plate is tilted relative to the shaft, the volumetric capacity of the pump is gradually increased up to the maximum. The speed of rotation of the motor unit, of course, increases in direct proportion to the volume of fluid delivered to it by the pump. Flow of fluid into and out of the pump cylinders 46, that is, between the pump cylinders and the motor cylinders, is by way of suction and discharge passages 60 and 61 formed in the interposed valve plate 10.

As will be seen by reference to FIGS. 2 and 4, the passages 60 and 61 are elongated arcuate slots disposed symmetrically on opposite sides of the rotational axis of the pump and motor shafts. More particularly, the passages are located and dimensioned so that the passage 48 of each pump cylinder registers with the end 62 of the passage 60 substantially as the piston 50 in that cylinder begins its retracting or suction stroke and passes out of registration with the opposite end 63 of the passage as the piston completes that stroke. As the pump body continues to rotate, passage 48 is moved into registration with the end 64 of the discharge passage 61 as the piston 50 begins its advance or pressure stroke and moves out of registration with the other end 65 of the passage as the piston completes its stroke.

Cylinders 30 of the motor unit are brought into registration with the passages 60 and 61 sequentially in the same manner as the pump cylinders. Thus, the passage 36 for each cylinder 30 comes into registration with the end 64 of the pump discharge passage 61 when the piston 31 is at the inner end of the cylinder and ready to begin its power stroke. Registration with the passage 61 is interrupted upon completion of the power stroke and the passage 36 moves into registration with the end 62 of the passage 60 as the piston begins its idle or return stroke, the fluid in the cylinder being thus discharged through the passage and returned to the pumping cylinder or cylinders as they register with the valve passage.

Pressure developed in the cylinders 46 urges the pump body against the valve plate 10 which seals the ends of the pump cylinders against leakage and absorbs the thrust of the pump unit. To help maintain the seal, additional force is applied to the pump body to hold it against the valve plate by a spring 66 interposed between a shoulder on the shaft 14 and an abutment presented by a snap ring 67 seated in an internal groove in the pump body.

To make up for loss of fluid through leakage, the pump inlet passage 60 in the valve plate is connected by a passage 68 (FIG. 2) and conduit 69 with the sump or reservoir 12 which contains the fluid such as oil used in the transmission. In the illustrative embodiment a suitable valve incorporated in a valve block 70 is interposed in the fluid line. A similar passage 71 opening from the pump discharge passage 61 of the valve plate and connected by a conduit 72 with the valve block 70 provides a passage for by-passing the pump output to the reservoir when desired. Valve block 70 may be of conventional construction and may be operated in any preferred manner.

Referring now to FIGS. 2 and 4 of the drawings, both faces of the valve plate 10 are formed with smoothly finished flat bearing and sealing surfaces 75 of substantial area for cooperation with the inner faces 37 and 49 of the motor and pump bodies. The bearing surfaces 75 are located at both sides of and between the valve passages 60 and 61 to prevent leakage of fluid from either passage in the operation of the transmission.

In accordance with the invention, the thrust load imposed on the bearing and sealing surfaces 75 of the valve plate is relieved to a substantial degree by auxiliary hydrodynamic thrust bearings incorporated in the valve plate. Moreover, the auxiliary bearings are interrelated in a novel manner to enable them to function with a high degree of efficiency with both the pump and motor units despite the fact that the latter may and usually does operate at a substantially lower speed than the pump unit.

In the exemplary embodiment of the invention, three of the auxiliary bearings are provided on each face of the valve plate 10. The auxiliary bearings are exactly alike, each comprising an elongated channel 76 recessed in the face of the plate adjacent its marginal edge. The channels are dimensioned lengthwise so that three of them extend entirely around the valve plate with relatively narrow lands 77 separating the adjacent channels. Lands 77 are flush with and constitute extensions of the bearing and sealing surfaces 75. As will be seen by reference to FIGS. 2 and 4, the channels 76 are spaced inwardly from the outer edge of the valve plate leaving a narrow bearing and sealing surface 78 coplanar with the surface 75.

To enable the auxiliary bearings to provide hydrodynamic bearing support for the pump and motor bodies, the channels 76 are formed to provide a viscous pumping effect incident to rotation of those bodies relative to the valve plate. For this purpose, each channel is formed to present a relatively shallow central section 79 (FIG. 6) terminating at opposite ends in substantially deep pockets 80. The provision of the two pockets enables the auxiliary bearings to function with the adjacent pump or motor body being rotated in either direction.

Oil is supplied to each auxiliary bearing channel 76 through an inlet passage 81 formed by a slot intersecting the channel substantially centrally and extending across the annular bearing surface 78 to the outer edge of the valve plate. Since in practice, the pump is substantially completely immersed in the oil in the reservoir 12 a continuous supply of oil is available. As shown in FIG. 7 the passages 81 at opposite sides of the valve plate are connected by a bore 82 extending through the plate.

It will be apparent that when oil is supplied to the shallow section 79 of the bearing channels, rotation of the adjacent pump or motor body will result in a pumping action due to the viscous shear or drag exerted on the thin layer of oil in the channel. This drag continues at the surfaces of the oil in the deeper pocket 80. As the oil particles meet the land 77 marking the end of the pocket, their kinetic energy is converted to potential energy which appears in the form of hydrostatic pressure exerted within the pocket 80 in all directions. This pressure provides a supporting force resisting the thrust of the pump or motor body toward the valve plate 10.

A feature of particular importance is the interconnection of the auxiliary bearing channels on opposite sides of the bearing plate to insure proper support for the body of the slower rotating unit at all times. Usually, such support will be required by the motor body 25 which in practice will ordinarily rotate at a slower speed than the pump body which is driven directly by the input shaft 14. The connections between the bearing channels is provided by bores 83 extending through the bearing plate 10 and opening into the pockets 80 of the respective bearing channels.

If both the pump and motor are rotating at the same speed, equal pressures will build up in the pockets 80 at opposite sides of the valve plate so that no equalizing action is required. However, when the motor body is rotating slowly and the pump body rotating at its usual high speed, a substantially greater pressure will be built up in the pockets 80 facing the pump body. Pressure is equalized in the pockets facing the motor body by flow through the bores 83. While there may be a slight loss of pressure through the pumping sections 79 facing the motor body, there will be sufficient pumping action in the opposed pumping section to compensate for such leakage and maintain adequate pressure in the pockets 80 at both faces of the valve plate.

The hydrodynamic bearing arrangement above described is also advantageous in that it automatically compensates and maintains the proper clearance between the valve plate and the rotating bodies of the motor and pump units. Thus, if the pumping sections 79 of the bearing channels deliver too much oil to the pockets 80 on either side of the bearing plate, the resulting pressure increase forces one or both of the bodies away from the valve plate. This increases the size of the leakage path across the pocket boundary or dam and consequently tends to reduce the pressure in the pockets.

It is to be particularly noted that the slight difference in oil film and the thickness or clearance in the channel section 79 as compared with the clearance at the land 77 result in a large percentage of change at the land for any given change in the position of the pump or motor body relative to the valve plate. Thus, assume by way of example that the clearance between the valve plate and the adjacent body at the land 77 is .0005 inch and the clearance at the pumping section 79 of the bearing channel is .001 inch and that the pumping action produces sufficient pressure to displace the adjacent body by an increment of .0005 inch. Such displacement doubles the clearance at the land 77 while the clearance at the pumping section of the channel has been increased only by one half. In other words, the leakage path has doubled in size while the viscous pumping clearance has been increased only slightly. Compensation is thus effected quickly and efficiently without producing surges of fluid which might result in momentary loss of bearing support.

Leakage of fluid from the auxiliary bearing channels, as well as any leakage from the valve passages, is collected and returned to the reservoir by suitable channels formed in the faces of the valve plate. Thus, in the face of the plate facing the motor unit, annular channels 85 and 86 are formed respectively on opposite sides of the channel 76. These drainage channels open into the passages 81 which are in communication with the reservoir. At the opposite faces of the valve plate a single drainage channel 87 is provided inwardly of the bearing channels 79 for return of leakage fluid.

It will be apparent from the foregoing that the invention provides an auxiliary thrust bearing organization of novel and advantageous character for hydrostatic power transmissions of the type in which the pump and motor units are assembled back-to-back at opposite sides of a common valve plate. The auxiliary thrust bearing provided by the invention materially increases the bearing capacity of such valve plate without necessitating any increase in its dimensions. Furthermore, the additional bearing force is hydrodynamic and is self-regulating to meet the precise needs of the transmission. Of particular importance is the interrelationship of the auxiliary thrust bearings for the pump and motor units so that adequate pressures are maintained for the support of the slower rotating unit.

The self-regulating action is effective not only for maintaining a stabilized film clearance between the cylinder barrel and valve plate under varying operating pressures, but the auxiliary thrust pads can act individually to stabilize the cylinder barrel against tilting moments.

I claim as my invention:

1. A hydrostatic rotary power transmission of the axial piston type comprising oppositely facing pump and motor units including coaxial revolving cylinder and piston assemblies with associated input and output shafts and slant-plate operating mechanism, a valve plate member interposed between the cylinder assemblies to form fluid supply and return ducts, annular fluid sealing and thrust bearing surfaces on each side of the valve plate surrounding the ducts, a hydrodynamic auxiliary thrust bearing on the valve plate cooperating with the pump unit to furnish additional thrust bearing area for the pump cylinder upon pressure fluid hydrodynamically generated by the rotation of the pump cylinder, an auxiliary thrust bearing on the opposite side of the valve plate cooperating with the motor unit to furnish additional bearing area for the motor cylinder, and means connecting said auxiliary bearings for supply of dynamically generated pressure fluid from the pump bearing to the motor bearing whereby the motor cylinder receives auxiliary thrust support upon pressure fluid hydrodynamically generated by rotation of the pump cylinder when the motor cylinder is not revolving at substantial speed.

2. A hydrostatic rotary power transmission of the axial piston type comprising oppositely facing pump and motor units including coaxial revolving cylinder and piston assemblies with associated input and output shafts and slant-plate operating mechanism, a valve plate member interposed between the cylinder assemblies to form fluid supply and return ducts, annular fluid sealing and thrust bearing surfaces on each side of the valve plate surrounding the ducts, a hydrodynamic auxiliary thrust bearing on the valve plate cooperating with the pump unit to furnish additional thrust bearing area for the pump cylinder upon pressure fluid hydrodynamically generated by the rotation of the pump cylinder, an auxiliary thrust bearing on the opposite side of the valve plate cooperating with the motor unit to furnish additional bearing area for the motor cylinder, and means including a restricted passage connecting said auxiliary bearings for supply of dynamically generated pressure fluid from the pump bearing to the motor bearing whereby the motor cylinder receives auxiliary thrust support upon pressure fluid hydrodynamically generated by rotation of the pump cylinder when the motor cylinder is not revolving at substantial speed.

3. A hydrostatic rotary power transmission of the axial piston type comprising oppositely facing pump and motor units including coaxial revolving cylinder and piston assemblies with associated input and output shafts and slant-plate operating mechanism, a valve plate member interposed between the cylinder assemblies to form fluid suply and return ducts, annular fluid sealing and thrust bearing surfaces on each side of the valve plate surrounding the ducts, a hydrodynamic auxiliary thrust bearing on the valve plate cooperating with the pump unit to furnish additional thrust bearing area for the pump cylinder upon pressure fluid hydrodynamically generated by the rotation of the pump cylinder, an auxiliary thrust bearing also of the hydrodynamic type on the opposite side of the valve plate cooperating with the motor unit to furnish additional bearing area for the motor cylinder, and means connecting said auxiliary bearings for supply of dynamically generated pressure fluid from the pump bearing to the motor bearing whereby the motor cylinder receives auxiliary thrust support upon pressure fluid hydrodynamically generated by rotation of the pump cylinder when the motor cylinder is not revolving at substantial speed.

4. In combination a rotary pump having a drive shaft, a cylinder barrel rotatable therewith and having a plurality of cylinder bores with fluid ports in an end face thereof, pistons reciprocable in the bores, means for actuating the pistons upon rotation of the shaft and cylinder barrel, a stationary valve plate surface in fluid sealing relation to the end face of the cylinder barrel and subject to end thrust therefrom, a rotary fluid motor having a driven shaft, a cylinder barrel rotatable therewith and having a plurality of cylinder bores with fluid ports in an end face thereof, pistons reciprocable in the bores, means for actuating the driven shaft upon reciprocation of the pistons, a stationary valve plate surface in fluid sealing relation to the end face of the motor cylinder barrel and subject to end thrust therefrom, an auxiliary thrust bearing surface of the pump valve plate surface having a hydrodynamic pressure generating land, and an auxiliary thrust bearing surface on the motor valve plate surface having direct communication with said pressure generating land.

5. In combination a rotary pump having a drive shaft, a cylinder barrel rotatable therewith and having a plurality of cylinder bores with fluid ports in an end face thereof, pistons reciprocable in the bores, means for actuating the pistons upon rotation of the shaft and cylinder barrel, a stationary valve plate surface in fluid sealing relation to the end face of the cylinder barrel and subject to end thrust therefrom, a rotary fluid motor having a driven shaft, a cylinder barrel rotatable therewith and having a plurality of cylinder bores with fluid ports in an end face thereof, pistons reciprocable in the bores, means for actuating the driven shaft upon reciprocation of the pistons, a stationary valve plate surface in fluid sealing relation with the end face of the cylinder barrel and subject to end thrust therefrom, an auxiliary thrust bearing on the pump valve plate surface having a hydrodynamic pressure generating land, an auxiliary thrust bearing on the motor valve plate surface having direct communication with the pressure generating land on the pump valve plate surface and a hydrodynamic pressure generating land on the motor valve plate surface also communicating with the motor auxiliary bearing.

6. In a hydraulic power transmission system of the type having a rotary pump and a rotary motor each including a stationary valve plate surface forming a fluid sealing and thrust receiving member for the respective rotary pump and motor elements, that improvement which comprises an auxiliary hydrodynamic thrust bearing on said pump valve plate surface, an auxiliary hydrodynamic thrust bearing on said motor valve plate surface, and means hydrodynamically responsive to pump rotation alone for supplying fluid to both auxiliary hydrodynamic bearings.

7. In a hydraulic power transmission system of the type having a rotary pump and a rotary motor each including a stationary valve plate surface forming a fluid sealing and thrust receiving member for the respective rotary pump and motor elements, that improvement which comprises an auxiliary hydrodynamic thrust bearing on said pump valve plate surface, an auxiliary hydrodynamic thrust bearing on said motor valve plate surface, each of said bearings including a recessed pressure pad having raised sealing boundaries to confine fluid under pressure between the pad and the adjacent respective pump or motor element, and means on said pump valve plate surface for forming a viscous friction pump for supplying pressure fluid to the pressure pads of both the pump and motor auxiliary hydrodynamic bearings.

8. A valve plate member for use in an axial piston hydrostatic power transmission comprising means forming a pair of combined fluid sealing and bearing surfaces of annular shape on opposite sides of the member, and each constructed to surround a pair of kidney-shaped through passages, an auxiliary thrust bearing surface on one face of the member having a raised boundary and having a viscous pumping device formed by a zone of changing surface height adjacent said auxiliary bearing surface, a second auxiliary thrust bearing surface on the opposite face of the member, and means for feeding pressure fluid from the viscous pumping device through the valve plate member to the second auxiliary bearing surface.

References Cited in the file of this patent

UNITED STATES PATENTS

| | | |
|---|---|---|
| 1,817,080 | Howard | Aug. 4, 1931 |
| 1,867,308 | Durner | July 12, 1932 |
| 2,972,962 | Douglas | Feb. 28, 1961 |